US012797921B2

(12) United States Patent
Jacobsen

(10) Patent No.: US 12,797,921 B2
(45) Date of Patent: Nov. 17, 2026

(54) STORAGE OF ORGANIC MATERIAL IN BOGS TO REDUCE CO2 IN THE ATMOSPHERE

(71) Applicant: Jarala AS, Trondheim (NO)

(72) Inventor: Tom Jacobsen, Trondheim (NO)

(73) Assignee: JARALA AS, Trondheim (NO)

(*) Notice: Subject to any disclaimer, the term of this patent is extended or adjusted under 35 U.S.C. 154(b) by 172 days.

(21) Appl. No.: 18/730,052

(22) PCT Filed: Jan. 16, 2023

(86) PCT No.: PCT/NO2023/050007
§ 371 (c)(1),
(2) Date: Jul. 18, 2024

(87) PCT Pub. No.: WO2023/140740
PCT Pub. Date: Jul. 27, 2023

(65) Prior Publication Data

US 2025/0100030 A1 Mar. 27, 2025

(30) Foreign Application Priority Data

Jan. 20, 2022 (NO) .................................. 20220077

(51) Int. Cl.
*B09B 1/00* (2006.01)
*B65G 5/00* (2006.01)
(Continued)

(52) U.S. Cl.
CPC .................. *B09B 1/00* (2013.01); *B65G 5/00* (2013.01); *E21F 15/005* (2013.01); *B09B 2101/85* (2022.01)

(58) Field of Classification Search
CPC ......... B09B 1/00; B09B 2101/85; B65G 5/00; E21F 15/005
See application file for complete search history.

(56) References Cited

U.S. PATENT DOCUMENTS

| | | |
|---|---|---|
| 4,576,513 A | 3/1986 | Lindorfer et al. |
| 4,750,454 A | 6/1988 | Santina et al. |

(Continued)

FOREIGN PATENT DOCUMENTS

| | | |
|---|---|---|
| CN | 101224464 | 7/2008 |
| CN | 102424481 B | 12/2014 |

(Continued)

OTHER PUBLICATIONS

Li et al.; Machine Translation CN 102424481 A; All; 2012 (Year: 2012).*

(Continued)

*Primary Examiner* — Benjamin F Fiorello
(74) *Attorney, Agent, or Firm* — Knobbe, Martens, Olson & Bear, LLP

(57) ABSTRACT

A new method for storing $CO_2$ in the form of naturally bound carbon over a long period of time. More specifically, a method for storing organic material in bogs to reduce $CO_2$ in the atmosphere. The method, includes the steps of providing organic material, mixing the organic material with water to form a pumpable slurry, pumping the slurry into a bog through one or more pipes, monitoring the bog and taking measures if required to maintain its conservation capabilities.

11 Claims, 2 Drawing Sheets

(51) Int. Cl.

| | |
|---|---|
| ***E21F 15/00*** | (2006.01) |
| *B09B 101/85* | (2022.01) |

(56) References Cited

U.S. PATENT DOCUMENTS

| | | | | |
|---|---|---|---|---|
| 5,439,318 | A * | 8/1995 | Stark | B09C 1/08 588/257 |
| 6,283,676 | B1 * | 9/2001 | Hater | B09B 1/00 405/129.7 |
| 8,092,118 | B2 * | 1/2012 | Atkin | C05D 3/02 47/58.1 SC |
| 8,662,791 | B2 * | 3/2014 | Allen | C12M 43/02 405/129.1 |
| 11,162,218 | B1 * | 11/2021 | Clayton | D21C 7/02 |
| 2006/0222464 | A1 * | 10/2006 | Schwalbe | B09B 1/006 405/129.95 |
| 2010/0145716 | A1 | 6/2010 | Zeng | |
| 2010/0257775 | A1 | 10/2010 | Cheiky | |
| 2011/0000270 | A1 | 1/2011 | Disbrow | |
| 2011/0030957 | A1 | 2/2011 | Constantz | |
| 2012/0285873 | A1 * | 11/2012 | Brenan | B02C 18/0084 210/194 |
| 2015/0217296 | A1 * | 8/2015 | Lowe | B02C 18/16 241/25 |
| 2021/0285017 | A1 | 9/2021 | Feldmann et al. | |
| 2021/0324258 | A1 | 10/2021 | Allen, III | |

FOREIGN PATENT DOCUMENTS

| | | | |
|---|---|---|---|
| CN | 105174473 | | 10/2017 |
| FI | 20207027 | A1 | 8/2021 |
| SE | 426325 | B | 12/1982 |
| WO | WO 2009/137948 | | 11/2009 |
| WO | WO 2009137948 | A2 | 11/2009 |
| WO | WO 2014/179904 | | 11/2014 |

OTHER PUBLICATIONS

Ervasti; Machine Translation FI 20207027 A1; All 2021 (Year: 2021).*

Faoun; "Peatland mapping and monitoring" all; 2020 (Year: 2020).*

Search Report issued in Finnish U.S. Appl. No. 20/245,947, dated Feb. 16, 2025.

"Make the marsh wet again", The County Man, Nov. 14, 2018, in 3 pages.

"Restoration of bogs", Nibio, Nov. 10, 2020, in 5 pages.

"Wetland restoration plan in Norway", Environment Directorate, 2016-2020, in 67 pages.

International Search Report and Written Opinion issued in International Application No. PCT/NO2023/050007, mailed on May 19, 2023.

Search Report issued in Norwegian Application No. 20220077, dated May 18, 2022.

Office Action issued in Swedish Application No. 2450850-9, dated Jan. 10, 2025.

* cited by examiner

STORAGE OF ORGANIC MATERIAL IN BOGS TO REDUCE CO2 IN THE ATMOSPHERE

FIELD OF THE INVENTION

The present invention relates to a method for storing organic material in a bog or bogland to reduce $CO_2$ in the atmosphere and thereby reducing global warming.

BACKGROUND OF THE INVENTION

The Paris Agreement is an international agreement on climate policy joined by almost all UN member states. The agreement establishes a goal of limiting the temperature rise on Earth to "well below" 2° C., and preferably to 1.5° C. It commits member states to set new and more ambitious targets to reduce their greenhouse gas emissions every five years, and establishes rules for how to report on their climate work.

Global warming is caused by the emission of greenhouse gases (GHG), in particular carbon dioxide ($CO_2$).

Organic material, such as wood chips and other plant waste, contains a lot of carbon. As an example birch contains the equivalent of 920 kg $CO_2$ per $m^3$. If such material is stored for long period of time (even geological timespan) instead of being decomposed, the carbon will remain stored and correspondingly less carbon (=$CO_2$) will be present to the atmosphere. This can be achieved if the material is placed in a bog where organic material does not rot. Anaerobic and sterile conditions in the bog mean that nothing rots therein, but can remain for many thousands of years. Here reference is made to so-called bog-woods and bog bodies.

A bog is an ecosystem in which the conversion of dead organic material, mainly plant waste/remains, proceeds so slowly that layers of partially decomposed material, i.e. peat, with a thickness of at least 30 cm are formed. Bogs therefore function as natural carbon stores. Only in Norway the amount of carbon stored in bogs is equivalent to 3.5 billion tonnes of $CO_2$. Globally, estimated 2.200 billion tonnes $CO_2$ is stored in bogs and annually 2 billion tonnes are released from damaged bogs and burning of peat.

In order to meet the targets of the Paris Agreement, there is a need for new measures to reduce the growth of $CO_2$ in the atmosphere, eventually to zero, were carbon capture and storage (CCS) will be required. Reversing the destruction of bogs and on the contrary using the bogs capacity to store additional carbon may be a significant contribution to reduce GHG levels in the atmosphere.

Now, the present inventor has surprisingly found that by dividing organic material into small particles and preparing a slurry thereof together with water, the material can be placed into a bog or bogland without destroying its preservative properties.

On this basis, the present invention has been provided.

SUMMARY OF THE INVENTION

It is a main object of the present invention to provide a new method for storing $CO_2$ in the form of naturally bound carbon (carbon sequestration) over a long period of time.

Another object of the present invention is to provide a method for storing organic material to reduce $CO_2$ in the atmosphere.

Yet another object of the invention is raising the level of bogs to a higher level, to allow farming without causing drying out, lowering decomposition of the peat in the bog and release of $CO_2$. Hence, farming on bogs and storage of $CO_2$ may be combined.

These and other objects are obtained by subject-matter as defined in the accompanying claims.

DEFINITIONS

It is to be understood that the herein disclosed invention is not limited to the particular steps of the methods described since such method may vary. It is also to be understood that the terminology used herein is for purpose of describing particular embodiments only and is not intended to be limiting.

It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several means, and the like. Furthermore, the words "comprising", "including", "containing" and similar wordings does not exclude other elements or steps.

The term "bog" as used herein means any bog, marsh or wetland where organic material decomposes very slowly or hardly not at all, in such a way that new organic material from natural growth mostly remains un-decomposed.

The terms "bog" and "bogland" as used herein have the same meaning and are used interchangeably in the present disclosure.

The term "peat" as used herein means the original organic material of which the bog is composed.

The term "pump" as used herein means any devise for pumping fluid material through pipes or hose, being for example, but not limited to piston-, roller, screw or centrifugal pumps The term "slurry" as used herein means any mixture of fluid and solid, ranging from very low concentration to thick concrete-like mass which requires a high-pressure pumping.

The term "pipe" as used herein is the pipe through which the slurry is pumped into the bog.

DETAILED DESCRIPTION OF THE INVENTION

The present invention provides a method for storing organic material, comprising the following steps:

- providing organic material;
- mixing the organic material with water to form a pumpable mixture/slurry;
- pumping the mixture/slurry into a bog or bogland through one or more pipes; and
- monitoring the bog/bogland and taking measures if required to maintain its conservation capabilities.

Figure 1:
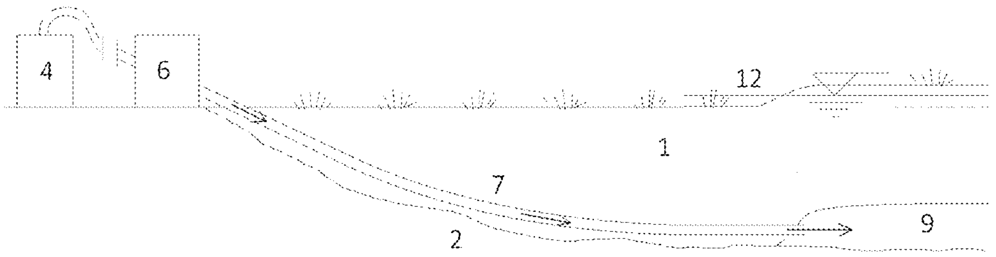
FIG. 1: Schematically illustrates how organic material is supplied to a bog by the method of the invention in general.

FIG. 1 gives an overview of how the organic material is placed in the bog by the present method.

Figure 2:
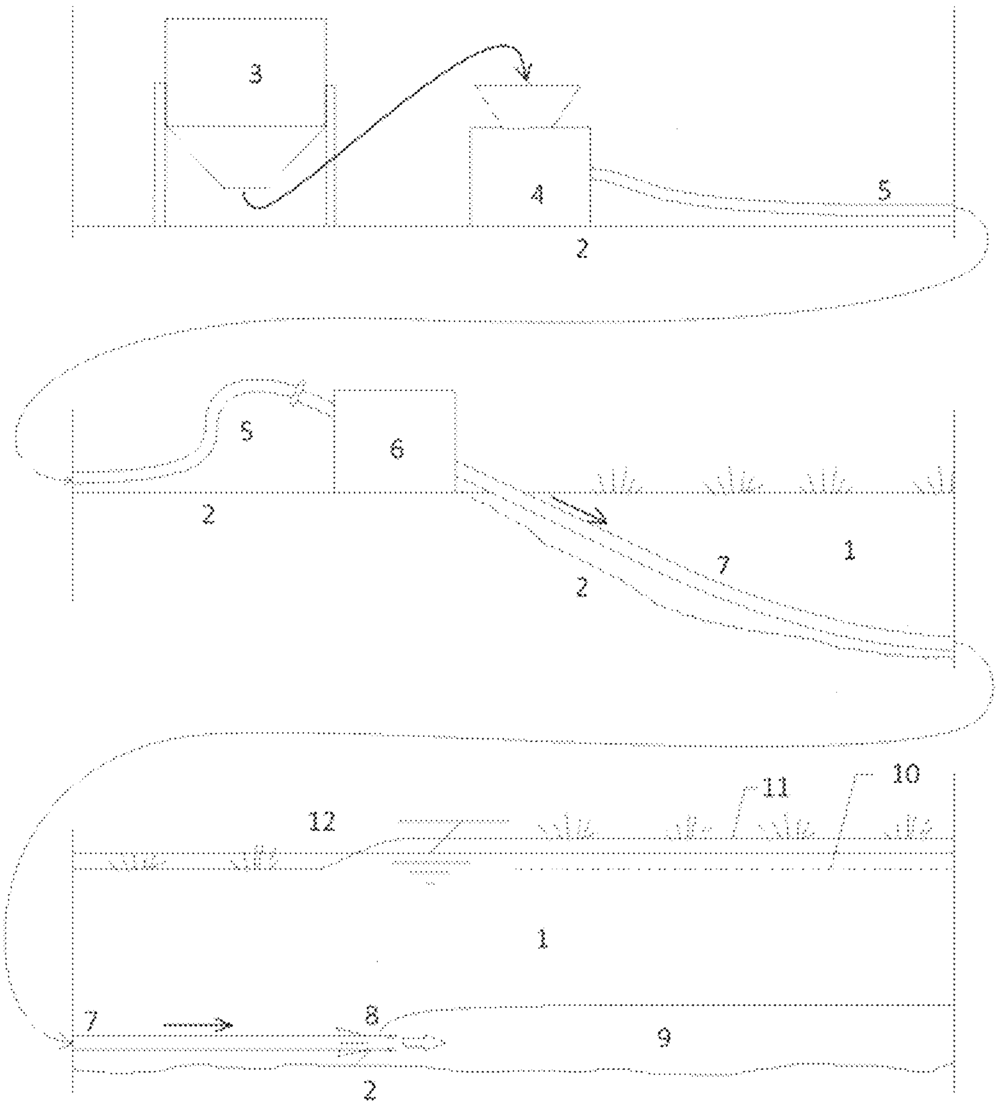
FIG. 2: Schematically illustrates the method of the invention in more detail and with preferable embodiments included. The three parts of FIG. 2 which are arranged below each other shall be regarded as if they were placed one after the other as the connecting lines indicate.

FIG. 2 illustrates the method in more detail showing a vessel containing a mixture/slurry 3 of organic material and water for pumping via a pump 4. The vessel and pump are placed on non-organic ground 2 such as rock or loose material next to a bog 1. The pump 4 is connected to a pipe 7 installed at the bottom of the bog, through which the slurry 3 is pumped into the bog for placement and storing of organic material 9. The pump 4 and pipe 7 may be connected by a flexible pump hose 5 and a device 6 for drilling or pushing the pipe 7 into the bog 1. The tip of the pipe 8 may be equipped with a drill head and/or guide system. The supply of organic material to the bog may raise the original level of the bog 10 to a new level of the bog 11, between which a preferred water table/level 12 lies.

The organic material is preferably plant material. Typically, the plant material consists of material from forestry, sawmills, paper mills and/or any other plant processing organic material.

In one embodiment of the invention, the organic material consist of remains from forestry and/or sawmills, such as twigs, bark, wood chips and the like. Nutrient-poor wood chips is particularly suitable, while green, nutrient rich parts of plant waste may be used as fertilizer on the bog or for example in nearby woods.

The organic material may also be algae or small plants that are collected in the nature, or that are grown specifically for the purpose of being stored in bogs.

The organic material is, unless it is algae or other small plants, divided into smaller parts; i.e. in any case smaller than the pipe diameter, and preferably substantially smaller than the pipe to enable efficient pumping.

The organic material may be divided by grinding into smaller parts such as particles of suitable size. Typically, the particles (chips in the case of wood) are in centimetre (cm) size, e.g. 0.3-6 cm. There is, however, no lower or upper limit to the particle size as long as the particles mixed with water are pumpable and adapted to the dimensions of the pipes. As long as the particles meet the criteria for transport and storage in bogs, the optimum particle size will be a function of grinding cost and pumping cost as larger particles are less expensive to produce but more expensive to pump.

In one embodiment of the invention, the organic material is divided into very small parts, i.e. smaller than millimetre (mm) size, so that the stored organic material forms a nearly watertight body with hindered oxygen transport in order to further reduce the rate of decomposition.

The organic material is mixed with water to form a pumpable slurry. Excluding chemically and physically bound water in the slurry, very little additional water may be required to make the slurry pumpable. More water may however be added to reduce friction loss and pumping over longer distances. Typically, the slurry consists of 10-90% organic material and correspondingly 90-10% water.

The slurry may be prepared elsewhere and transported to the bog/bogland. Alternatively, the slurry may be prepared near the bog/bogland by mixing particles of organic material and water from a source close by the bog (e.g. a lake) or from the bog itself. Bog water is low in oxygen which is beneficial in terms of preservation.

The ground organic material may also be prepared either elsewhere or close to the bog/bogland.

The plant material can also be transported by road or rail, either as raw material that is ground and mixed with water at site, as dry processed/grinded plant material or as slurry ready for pumping.

The slurry can be pumped in several stages, allowing for any pumping distance, and it is therefore possible to pump the slurry all the way from a plant, for example paper mill or saw-mill to the bog where the slurry is stored.

The slurry is pumped through pipes down to lower parts of existing bogs.

Preferably, thin pipes are used to reduce the impact on nature due to the size of pumping equipment and the requirements for transport and handling of organic material. That is, pipes with a diameter of 5-30 cm, preferably in the range of 10-15 cm. The length of the pipes may be several kilometres.

The pipes used in the method of the invention, can be installed into the bog in advance, preferably directionally to be accurately installed along the bottom of the bog. Mapping of the bog and the ground under the bog may be carried out before laying the pipes to gain knowledge of where they most favourably should be laid. Said mapping may be carried out by using georadar or similar.

The pipes may be pushed into the bog, for instance by using a hydraulic device equipped with a crusher at the front and/or the front end being designed to cut through the bog. The pipe may also be drilled into the bog, either by rotation of the pipe itself or by a rotating drill head at the tip. In such case, the pipe has the function of a drill rod during the installation. Alternatively, or additionally, water may be pumped through the pipe to create hydraulic pressure to jack and opening in the peat in front of the pipe. High pressure water may also be supplied through jetting nozzles to break the bog.

Figure 3:
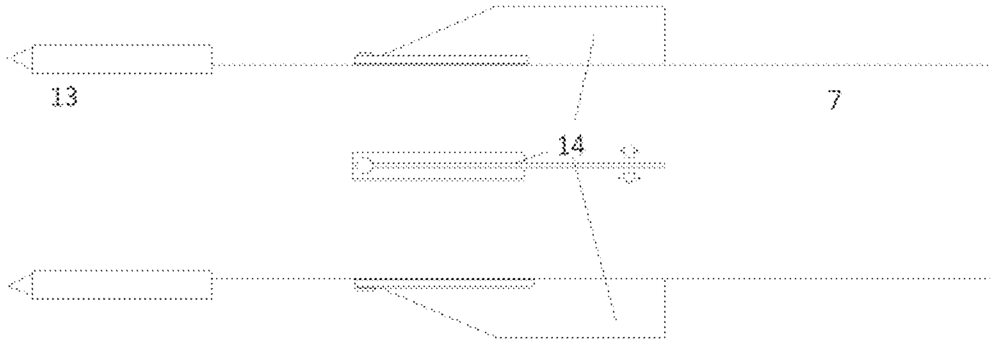
FIG. 3: Illustrates in detail an embodiment for installing pipes in a bog.

Preferably the pipes for injection of organic material are installed into the bog with high precision in the bog, with the objective of installing the pipe as close as possible to the terrain underlaying under the bog. This can be achieved with directional drilling or pushing, which uses features such as downhole navigation and pipe orientation. A guiding system for the end of the pipe or the drill-head may be adjustable fins or other means to direct the drill-head into desired direction. This is shown in FIG. 3 where guiding fins on the pipe enabling the pipe to be inserted at desired depth and routing at the bottom of the bog are illustrated. A pipe 7, drilled or pushed into a bog, equipped with guides 14 for directing the pipe and drill-head 13, is shown in FIG. 3.

In most cases it will be preferable to store the organic material near the bottom of the bog. It may not always be so however, and in some cases, it is better to store organic material at an intermediate level between the bottom and the surface of the bog due to easier drilling, if the bog is very deep or if conservation of organic material for some reason is better at an intermediate level.

According to a preferred embodiment of the invention, the device used for pushing or drilling the pipes into the bog is located next to the bog. In this way the bog is not damaged by weight or movement of the device.

According to an embodiment of the invention, slurry comprising organic material ground into fractions can be pumped through pipes of several kilometres with the least possible resistance.

The pipes may be installed obliquely and/or longitudinally. Thus, the slurry is pumped through substantially inclined or horizontal pipes which are pushed down through the bog. The pipes may be withdrawn as the slurry is pumped out or removed after the slurry has been installed in the bog.

Figure 4:
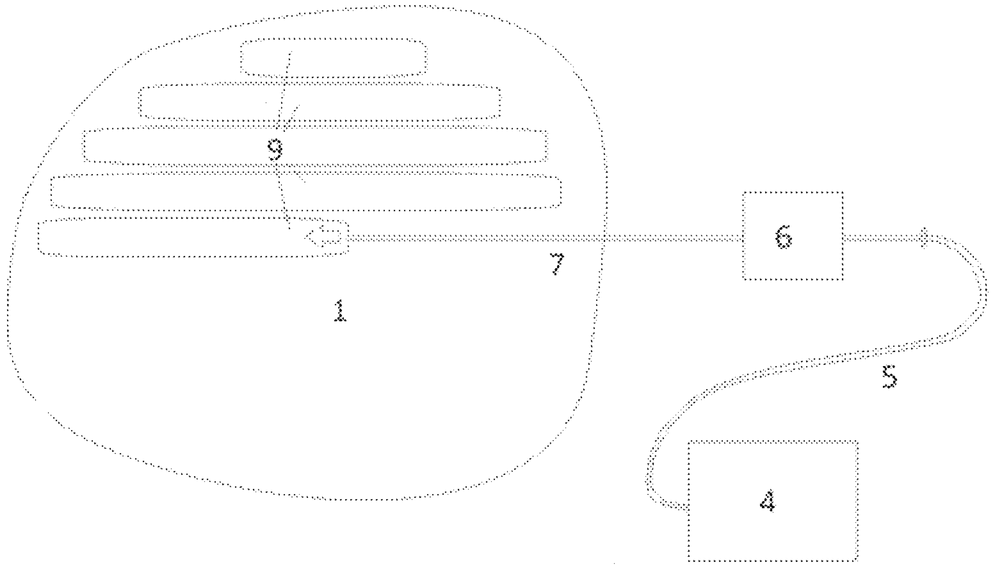
FIG. 4: Schematically illustrates an embodiment of organic material deposited in a bog.

In FIG. 4, deposited organic material after the pipe is withdrawn from the bog is illustrated. Organic material 9 is pumped into the bog 1 for storage by using a pump 4 equipped with a flexible pump hose 5, connected to a device 6 for drilling or pushing the pipe 7 connected thereto into the bog. The organic material 9 is pumped as a slurry through the pipe 7 and placed into the bog.

Furthermore, the pump used to pump the slurry into the bog may be located next to the said bog in order not to damage it. Thus, slurry may be pumped over long distances without the pump itself standing on the bog.

In the method of the invention, several types of pumps may be used, such as smaller roller pumps or centrifugal pumps with high flow and low pressure, and screw pumps and piston pumps with lower flow and higher pressure. A pump primarily intended for concrete or mortar may be used.

The slurry can be applied evenly by the pipe being retracted successively as the slurry is laid out on the bottom of the bog. Another variant is that the horizontal part of the pipes at the bottom of the bog is equipped with longitudinal slots or rows of holes causing distribution of the slurry along a larger length as counter-pressure is formed against the first holes.

According to an embodiment of the present invention, the slurry is laid out in a predetermined pattern so that the bog, if it rises, rises as evenly as possible, at the same time as the pipes are utilized as efficiently as possible.

Advance mapping of the bogland with georadar or similar may be used to map where in the bog the organic material can be placed.

Moreover, the bog is monitored during and after pumping of the slurry in order to monitor whether, and in that case, how the bog rises. A radar, lidar or similar is used for this monitoring. This is important to verify that the bog retains its conservation capabilities and, if necessary, take measures.

The monitoring of the bog after the organic material is pumped into it include, but is not limited to: biotope characteristics such as plant types and growth, water level, ground level, gas content and gas emissions and rate of decomposition in the bog.

It is a prerequisite that the bog is preserved. The ecosystem of the bog must be preserved so that plant remains rot at a natural and very slow pace, if they rot at all.

Thus, the bog will continue to act as a carbon storage both for self-produced plant material (peat) and for the plant material that has been added. The bog is preserved first and foremost by keeping the water level at a favourable level.

Existing bogs can be naturally or artificially drained. In order to be able to preserve carbon in bogs in general, and in bogs where slurry of organic material has been added according to the present invention, the water level is kept so high that the bog does not dry out and provide access to oxygen causing rotting.

Active measures taken to maintain the bog include, but is not limited to: adjustment of water level, fertilization, planting, removal of plants, improving conditions for wildlife and regulation of human activities.

In the method of the invention, measures have to be taken if monitoring of the bog shows that the water level of the bog changes. According to an embodiment of the invention, said measures may be raising the water level with light damming and/or backfilling of drainage ditches. This will ensure a high groundwater level with little water flow and hydrophilic vegetation that can make peat itself. The raising and/or maintaining of the bog water level, ensures a level at which the bog's original ecosystem does not change significantly, and so the bog continues to form layers of dead organic material.

The method of the invention enables storing of $CO_2$ in the form of naturally bound carbon over a long period of time, preferably for at least 100 years, more preferably for at least 1000 years, and most preferably for a geological time perspective.

The invention is explained in more detail in the example below. The example is only meant to be illustrative and shall not be considered as limiting.

EXAMPLE

A bog is mapped with geo-radar and is found large and deep enough and otherwise suitable for storage of additional organic material. Logging waste from a nearby logging ground is sorted into nutrient rich and nutrient poor fractions. The nutrient rich fractions are dispersed back to the logging area to provide fertilization whereas the nutrient poor parts are ground into pieces up to for example 2 cm and mixed with water from a nearby puddle in the bog to form a pumpable slurry. Meanwhile, 10 cm steel pipes have been pushed into the bog in such a way that the pipes lay along the bottom the bog, just above solid ground/loose rocky materials. The pipes are placed with suitable distance between them. Once pumping starts through the first pipe, the surface level is monitored by radar or similar. When the surface rises to a pre-determined level (e.g. plus 10 cm), the pipe is retracted so that the slurry is injected successively along the routing of the pipe. The procedure is repeated for neighbouring pipes whereas pipes that have been pulled out of the bog are installed in new locations.

The person skilled in the art realizes that the present invention is not limited to the preferred embodiments described above. The person skilled in the art further realizes that modifications and variations are possible within the scope of the appended claims. Additionally, variations to the disclosed embodiments can be understood and effected by the skilled person in practicing the claimed invention, from a study of the disclosure, and the appended claims.

What is claimed is:

1. A method for storing an organic material, comprising:
providing the organic material;
mixing the organic material with water to form a pumpable mixture/slurry;
pumping the mixture/slurry into a bog or a bogland through one or more pipe(s);
pushing or drilling said one or more pipe(s) into the bog to be installed directionally in the bog, horizontally along the bottom of the bog or the bogland, to guide said one or more pipe(s) in desired direction(s) along the bottom determined from mapping of the bog and the ground under the bog;
pulling back said one or more pipe(s) successively as the mixture/slurry is pumped into the bog; and
monitoring the bog or the bogland and taking measures to maintain its conservation capabilities.

2. The method according to claim 1, wherein the organic material is a plant material selected from the group consisting of materials from forestry, sawmills, paper mills, and any other plant processing organic material.

3. The method according to claim 1, wherein the organic material is a plant material divided into parts smaller than one cm in size.

4. The method according to claim 1, wherein the water is from the bog.

5. The method according to claim 1, wherein said one or more pipe(s) is/are equipped with longitudinal slots or rows of holes through which the mixture/slurry can pass.

6. The method according to claim 1, wherein said monitoring is to monitor biotope characteristics.

7. The method according to claim 6, wherein the biotope characteristics is selected from the group consisting of a plant type and growth, a water level, a ground level, a gas content and gas emission, and a rate of decomposition in the bog.

8. The method according to claim 1, wherein the measures taken to maintain the conservation capabilities are selected from the group consisting of an adjustment of water level, a fertilization, a planting, a removal of plants, improving conditions for wildlife and regulation of human activities.

9. The method according to claim 8, wherein measures of raising the water level of the bog are taken.

10. The method according to claim 8, wherein measures of at least one of damming or backfilling of drainage ditches are taken.

11. The method according to claim 1, wherein said one or more pipe(s) installed horizontally along the bottom of the bog or the bogland is/are equipped with longitudinal slots or a row of holes along a longitudinal direction of said one or more pipe(s).

* * * * *